US010525784B2

(12) United States Patent
Goffer et al.

(10) Patent No.: US 10,525,784 B2
(45) Date of Patent: Jan. 7, 2020

(54) SELF-LEVELING MECHANISM AND METHOD FOR WHEELED MOBILITY DEVICE

(71) Applicant: UPnRIDE Robotics Ltd, Yokneam Illit (IL)

(72) Inventors: Amit Goffer, Kiryat Tivon (IL); Roee Haimovich, Migdal Haemek (IL); Oren Tamari, Pardesia (IL); Dudu Haimovich, Ramat Yishai (IL)

(73) Assignee: UPNRIDE ROBOTICS LTD., Yokneam Illit (IL)

( * ) Notice: Subject to any disclaimer, the term of this patent is extended or adjusted under 35 U.S.C. 154(b) by 52 days.

(21) Appl. No.: 15/196,109

(22) Filed: Jun. 29, 2016

(65) Prior Publication Data
US 2018/0001729 A1     Jan. 4, 2018

(51) Int. Cl.
*B60G 17/019*     (2006.01)
*B60G 7/00*     (2006.01)

(52) U.S. Cl.
CPC ....... *B60G 17/01908* (2013.01); *B60G 7/001* (2013.01); *B60G 7/005* (2013.01); *B60G 2300/24* (2013.01); *B60G 2400/051* (2013.01)

(58) Field of Classification Search
CPC ........ B60G 2300/24; B60G 2400/0511; B60G 2400/0512; B60G 2800/912;
(Continued)

(56) References Cited

U.S. PATENT DOCUMENTS 3,869,011 A * 3/1975 Jensen ................... A61G 5/061
                                                180/9.23
4,054,319 A * 10/1977 Fogg, Jr. ................ A61G 5/042
                                                297/330
(Continued)

FOREIGN PATENT DOCUMENTS

FR          2553650         4/1985
JP        2007209704        8/2007
(Continued)

OTHER PUBLICATIONS

International Search Report for PCT Application No. PCT/IL2017/050405 dated Jul. 19, 2017.

*Primary Examiner* — Paul N Dickson
*Assistant Examiner* — Timothy Wilhelm
(74) *Attorney, Agent, or Firm* — William H. Dippert; Laurence A. Greenberg; Werner H. Stemer (57) ABSTRACT

A self-leveling mechanism for a mobility device, the mobility device including a chassis configured to propel the mobility device on a surface, includes a leveling structure on which is mounted a user support for supporting a user of the mobility device. The leveling structure is connected to the chassis by a swivel connection that enables the leveling structure to swivel about the connection, and by two linearly displaceable connections that are laterally displaced from one another. Two linear actuators are each configured to displace one of the displaceable connections to adjust a distance between each displaceable connection and the chassis. A sensor for senses a tilt of the leveling structure and a controller is configured to operate the linear actuators in accordance with the sensed tilt.

9 Claims, 7 Drawing Sheets

(58) Field of Classification Search
CPC .. B60G 17/01908; B60G 7/001; B60G 7/005; B60G 2400/051
See application file for complete search history.

(56) References Cited

U.S. PATENT DOCUMENTS

| | | | | |
|---|---|---|---|---|
| 4,194,584 | A * | 3/1980 | Kress | B62D 55/075 180/6.5 |
| 4,437,537 | A * | 3/1984 | Ausmus | A61G 5/14 180/214 |
| 4,566,707 | A * | 1/1986 | Nitzberg | A61G 5/066 180/8.2 |
| 4,623,194 | A * | 11/1986 | Pillot | A61G 5/14 297/316 |
| 5,346,280 | A * | 9/1994 | Deumite | A61G 5/14 180/907 |
| 5,577,567 | A * | 11/1996 | Johnson | A61G 5/061 180/9.23 |
| 5,791,425 | A * | 8/1998 | Kamen | A61G 5/04 180/21 |
| 6,068,280 | A * | 5/2000 | Torres | A61G 5/045 180/328 |
| 6,125,957 | A * | 10/2000 | Kauffmann | A61G 5/14 180/65.1 |
| 6,231,067 | B1 * | 5/2001 | Johnson | A61G 5/14 180/65.1 |
| 6,273,203 | B1 * | 8/2001 | Paggi | B62D 33/0608 180/89.13 |
| 6,543,564 | B1 * | 4/2003 | Kamen | A61G 5/04 180/327 |
| 6,571,892 | B2 * | 6/2003 | Kamen | A61G 5/061 180/21 |
| 7,614,699 | B2 * | 11/2009 | Torres | A61G 5/045 297/344.14 |
| 7,635,164 | B2 * | 12/2009 | Torres | A61G 5/045 297/344.14 |
| 7,717,210 | B2 * | 5/2010 | Mahy | A61G 5/046 180/209 |
| 7,815,209 | B2 * | 10/2010 | Porcheron | A61G 5/12 280/250.1 |
| 8,170,780 | B2 * | 5/2012 | Field | B60N 2/045 152/209.27 |
| 8,564,499 | B2 * | 10/2013 | Bateman | H01Q 3/08 343/880 |
| 8,567,804 | B1 * | 10/2013 | Hoenhause | A61G 5/042 180/65.1 |
| 8,702,108 | B2 * | 4/2014 | Zanderlehn | A61G 5/061 180/209 |
| 8,973,997 | B2 * | 3/2015 | Green | A61G 5/1067 297/284.11 |
| 9,044,369 | B2 * | 6/2015 | Goldish | A61G 5/14 |
| 9,073,399 | B1 * | 7/2015 | Richter | B60G 17/0165 |
| 9,173,792 | B2 * | 11/2015 | Goffer | A61G 5/12 |
| 9,827,823 | B2 * | 11/2017 | Bekoscke | B60G 21/04 |
| 2002/0027385 | A1 * | 3/2002 | Porcheron | A61G 5/14 297/466 |
| 2007/0063480 | A1 | 3/2007 | Porcheron | |
| 2009/0037051 | A1 * | 2/2009 | Shimizu | B60G 17/0162 701/38 |
| 2012/0053788 | A1 * | 3/2012 | Amino | B60G 17/0165 701/37 |
| 2013/0219615 | A1 * | 8/2013 | Eklof | A61G 7/1017 5/83.1 |
| 2015/0060162 | A1 * | 3/2015 | Goffer | A61G 5/12 180/41 |
| 2016/0045382 | A1 | 2/2016 | Goffer | |
| 2016/0101664 | A1 * | 4/2016 | Richter | B60G 99/002 701/49 |

FOREIGN PATENT DOCUMENTS

| | | |
|---|---|---|
| KR | 101545692 | 8/2015 |
| WO | WO2010/140560 | 11/2012 |

* cited by examiner

SELF-LEVELING MECHANISM AND METHOD FOR WHEELED MOBILITY DEVICE

FIELD OF THE INVENTION

The present invention relates to wheeled mobility devices. More particularly, the present invention relates to a mechanism and method for self-leveling of a user of a wheeled mobility device.

BACKGROUND OF THE INVENTION

Various types of wheeled mobility devices may provide mobility to a user whose mobility may be limited due to a temporary or permanent physical condition. Temporary conditions may include injury, trauma, illness, unconsciousness, or other conditions. Permanent or long term conditions may include from paraplegia, quadriplegia, multiple sclerosis (MS), amyotrophic lateral sclerosis (ALS), and similar conditions Various types of wheelchairs and wheeled mobility devices may enable person to be moved about while sitting or reclining. Where the user is conscious and is capable of exerting the arms and hands, the user may propel the wheels of the wheelchair or wheeled mobility devices without the assistance of another person. Various motorized wheelchairs and carts may enable a user to move the device by simply manipulating a control, with minimal exertion. Some such motorized wheelchairs and carts, as well as non-motorized wheelchairs, have been designed to shift the user from a seated to a standing position, and vice versa. Some have been designed to transport the user while either standing (only indoors) or seated, generally on level surfaces.

SUMMARY OF THE INVENTION

There is thus provided, in accordance with an embodiment of the present invention, a mobility device including a chassis configured to propel the mobility device on a surface; and a self-leveling mechanism, the self-leveling mechanism including: a leveling structure on which is mounted a user support for supporting a user of the mobility device, the leveling structure being connected to the chassis by a swivel connection that enables the leveling structure to swivel about the connection and by two linearly displaceable connections that are laterally displaced from one another; two linear actuators, each of the linear actuators configured to displace a displaceable connection of the two displaceable connections to adjust a distance between each displaceable connection and the chassis; a sensor for sensing a tilt of the leveling structure; and a controller that is configured to operate the linear actuators in accordance with a tilt that is sensed by the sensor.

Furthermore, in accordance with an embodiment of the present invention, the swivel connection includes a rod end bearing.

Furthermore, in accordance with an embodiment of the present invention, the swivel connection is located at a nonzero fixed distance from a floor of the chassis.

Furthermore, in accordance with an embodiment of the present invention, the displaceable connection is located along an arm of the leveling structure.

Furthermore, in accordance with an embodiment of the present invention, the displaceable connection is located at a front end of the leveling structure and the two displaceable connections are located at a rear end of the leveling structure.

Furthermore, in accordance with an embodiment of the present invention, the linear actuator includes a screw mechanism.

Furthermore, in accordance with an embodiment of the present invention, the displaceable connection includes a ball swivel.

Furthermore, in accordance with an embodiment of the present invention, each of the displaceable connections is configured to be displaced by its linear actuator substantially vertically.

Furthermore, in accordance with an embodiment of the present invention, the sensor includes an inertial measurement unit.

Furthermore, in accordance with an embodiment of the present invention, the sensor is configured to measure a pitch angle and a roll angle of the leveling structure.

Furthermore, in accordance with an embodiment of the present invention, the controller is configured to apply a control algorithm to calculate a displacement of one or both of the displaceable connections in accordance with a deviation of the measured pitch angle from a pitch angle of a target plane or a deviation of the measured roll angle from a roll angle of the target plane.

Furthermore, in accordance with an embodiment of the present invention, the size of the calculated displacement during a single iteration of the control algorithm increases when the deviation increases and decreases when the deviation decreases.

Furthermore, in accordance with an embodiment of the present invention, the mechanism includes a conversion mechanism to change a configuration of the user support between a configuration for supporting the user in a standing position and a configuration for supporting the user in seated position.

There is further provided, in accordance with an embodiment of the present invention, a method of controlling a tilt of a user support of a mobility device includes: receiving a sensed tilt of a leveling structure on which the user support is mounted, the leveling structure being connected to a chassis of the mobility device by a swivel connection that enables the leveling structure to swivel about the connection and by two linearly displaceable connections that are laterally displaced from one another; calculating a linear displacement, of each of two displaceable connections of the leveling structure that reduces a deviation of the sensed tilt of the stabilizing structure from an orientation of a target plane; and operating a linear actuator of each of the displaceable connections to displace each of the displaceable connections by the calculated displacement for that displaceable connection.

Furthermore, in accordance with an embodiment of the present invention, receiving the sensed tilt includes receiving a sensed pitch angle and a sensed roll angle.

Furthermore, in accordance with an embodiment of the present invention, the deviation of the sensed tilt of the self-leveling structure from the orientation of the target plane includes a pitch angular deviation of the sensed pitch angle from a pitch angle of a target plane and a roll angular deviation of the sensed roll angle from a roll angle of the target plane.

Furthermore, in accordance with an embodiment of the present invention, calculating the linear displacement includes calculating a linear combination of a pitch deviation distance calculated using the pitch angular deviation and a roll deviation distance calculated using the roll angular deviation.

Furthermore, in accordance with an embodiment of the present invention, a calculation of the pitch deviation distance includes raising an absolute value of the pitch angular deviation to a positive power or calculation of the roll deviation distance includes raising an absolute value of the roll angular deviation to a positive power.

Furthermore, in accordance with an embodiment of the present invention, operating an actuator of the two linear actuators includes controlling a speed of rotation of a motor of the actuator.

There is further provided, in accordance with an embodiment of the present invention, a self-leveling mechanism for a mobility device including a chassis configured to propel the mobility device on a surface, the mechanism including: a leveling structure on which is mounted a user support for supporting a user of the mobility device, the leveling structure being connected to the chassis by a swivel connection that enables the leveling structure to swivel about the connection and by two linearly displaceable connections that are laterally displaced from one another; two linear actuators, each of the linear actuators configured to displace a displaceable connection of the two displaceable connections to adjust a distance between each displaceable connection and the chassis; a sensor for sensing a tilt of the leveling structure; and a controller that is configured to operate the linear actuators in accordance with a tilt that is sensed by the sensor.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with an embodiment of the present invention, a wheeled mobility device includes a self-leveling mechanism that includes a tiltable leveling structure. The self-leveling mechanism may be operated to maintain the user of the wheeled mobility device at a substantially constant orientation relative to an external axis or plane, e.g., to the vertical or to the horizontal. As used herein, leveling or self-leveling refers to maintaining an orientation relative to a specified plane, whether or not the specified plane is horizontal.

A user support for supporting a user of the wheeled mobility device may be attached to the tiltable leveling structure. The orientation of the user support may be fixed with respect to the orientation of the tiltable leveling structure. For example, the user support may include a seat or bed, a harness structure that is configured to support the user in a standing position, or user support structure that is configured to support the user in a range of positions. For example, the user support may include a seat with restraints with a conversion mechanism that is operable to raise the user from a sitting position to a standing position, and vice versa. One or more extendible columns or rods may straighten or bend various hinges to convert a seat to a standing harness.

The tiltable leveling structure is connected to, or otherwise supported by, a chassis of the wheeled mobility device (e.g., via actuators and a rod end bearing, the rod end bearing also known as a heim joint or rose joint). The chassis may include or support a motorized propulsion mechanism for propelling the wheeled mobility device along a surface. For example, the chassis may include wheels or tracks that may be rotated or moved by the motorized propulsion mechanism. For example, the motorized propulsion mechanism may include an electric motor (e.g., powered by a storage battery or otherwise), an internal combustion engine, or another suitable motor.

A part of the tiltable leveling structure may be connected to the chassis via a swivel connection, e.g., at or near an edge or end of the tiltable leveling structure, e.g., along an arm of the tiltable stabilizing structure. For example, the swivel connection may be located near an end of an arm that extends forward approximately along a longitudinal midline (e.g., that is approximately midway between right and left sides of the tiltable leveling structure) of the tiltable leveling structure. The swivel connection to the chassis enables at least limited rotation about at least two orthogonal axes (e.g., defining pitch and roll of the tiltable stabilizing structure). For example, the joint may include a ball joint, a rod end bearing, or another passive joint that enables rotation about at least two axes.

As used herein, forward and backward longitudinal directions of the wheeled mobility device or its components are defined with reference to the orientation of a user that is being carried by the wheeled mobility device in a manner for which the wheeled mobility device is designed. In particular, the user is being supported by the user support such that the user's back is supported by, or is adjacent to, a back support panel of the user support. Right and left lateral directions, as well as pitch and roll of the likable leveling structure of the user support, are similarly defined.

For example, the swivel connection may be located on an arm of the tiltable leveling structure. For example, the arm may extend forward from the remainder of the tiltable leveling structure. The arm may include structure (e.g., bar or rod) that may pass through the opening of a rod end bearing whose shaft is fixed to chassis to form the swivel connection. For example, the shaft of the rod end bearing may rise approximately vertically from a floor (or other part) of the chassis such that the swivel connection is located at a nonzero fixed distance above the floor of the chassis. Alternatively, the arm, or other structure of the tiltable leveling structure, may otherwise connect to the chassis to form the swivel connection Two actuator assemblies are each configured to substantially linearly vertically displace one of two displaceable connections of the tiltable leveling structure. The two displaceable connections are laterally displaced (by the actuator) from one another and from the swivel connection. In some cases, the two displaceable connections may be vertically displaced relative to one another or relative to the swivel connection when the wheeled mobility device is resting on a level horizontal surface and the tiltable leveling structure is also oriented parallel to the surface. For example, each linear actuator may be operable to substantially linearly displace the displaceable connection of the tiltable leveling structure in the vertical direction. Thus, operation of each actuator may adjust a distance between its corresponding displaceable connection and a floor of the chassis. For example, the actuator may include a screw mechanism, a scissors mechanism, or eccentric disk mechanism, a hydraulic or pneumatic piston, or another suitable mechanism for effecting a substantially vertical displacement. The operation of the two linear actuators may cause the tiltable leveling structure to rotate relative to the swivel connection around one or more axes. Typically, operation of the two actuators may change a pitch angle, roll angle, or both or another angle, of the tiltable leveling structure.

The positions of the swivel connection and the displaceable connections may be selected to provide a predetermined degree of control or mechanical advantage. For example, mutual separation distances among the swivel connection and the displaceable connections may be selected to be as large as possible (e.g., within constraints that may be imposed by structure of the chassis, of the tiltable leveling structure, or of structure that is attached to the chassis or the tiltable leveling structure). For example, if the swivel connection is located on a forward extending arm near a lateral midline of the tiltable stabilizing structure, then the displaceable connections may be located near opposite corners at the rear edge of the tiltable leveling structure. The mutual lateral separations among the swivel connection and the displaceable connections may be selected such that the separation distance is large enough so as not to require excessive thrust by the actuator, while being small, enough so as to enable sufficiently rapid tilting of the self-leveling structure.

One or more sensors may be configured to sense a tilt of the tiltable leveling structure with respect to the horizontal or another predetermined plane. The sensors may be fixed to structure that is fixed to the tiltable leveling structure so as to tilt together with the tiltable leveling structure.

For example, the sensors may be configured to measure roll and pitch angles of the tiltable leveling structure relative to a target plane. The sensors may include one or more inertial measurement units, tilt sensors, or other sensors that may be configured to measure a tilt of the tiltable leveling structure with respect to a predetermined plane. For example, an inertial measurement unit may include one or more gyroscopes, accelerometers, fused gyro-accelerometers, inclinometers or tilt sensors, or other sensors capable of measuring or sensing an orientation, a change in orientation, a rate of change in orientation, or other quantities that may be interpreted to yield a current roll or pitch angle or other indicators of a tilt.

One or more surface tilt sensors may be mounted on the chassis to measure the tilt of a surface upon which the device is moving or standing. The measured surface tilt may be utilized to limit the dynamic range of the self-leveling mechanism. For example, when the wheeled mobility device is balanced and stable, the balance sensors output the target pitch and roll angles; by comparing to the measured surface-slope angles, the amount of tilt correction, done by the balancing mechanism, can be computed and hence alerting when the dynamic angles-correction range exceeds its permitted limits. Second, warn the system (and user) for hazardous slopes.

A controller of the wheeled mobility device may be configured to operate the actuators to maintain the tilt of the tiltable leveling structure substantially parallel to a predetermined target plane. For example, the target plane may be horizontal (characterized by zero pitch and roll angles). In some cases, another target plane may be selected. For example, a particular user of the wheeled mobility device may feel more comfortable when, or otherwise prefer, leaning slightly backward, forward, or sideways when being carried by the wheeled mobility device.

The controller may apply an iterative algorithm to operate the actuators in accordance with measured tilts. For example, in each iteration of the algorithm, a current tilt (e.g., roll and pitch) of the tiltable leveling structure may be measured. A deviation of the measured tilt from the orientation of the target plane may be calculated.

A function of the deviation in each angle (e.g., roll and pitch) may be applied to yield a correction step that includes a displacement along a straight line that is to be applied to correct the measured deviation. The function may be configured such that step size is proportionally larger (e.g., as expressed as a ratio of step size to angular deviation) for large deviations than it is for smaller deviations. For example, the function may include raising the deviation to a nonzero power. Parameters of the function may be determined by a technician and may depend on such factors as geometry of the tiltable stabilizing structure, properties of the actuators, or other factors.

The calculated displacement correction steps may be used to calculate a (e.g., vertical) displacement of each of the displaceable connections. A speed of operation of each of the actuators may be calculated such that the calculated displacement is achieved during the iteration. Each actuator may then be operated at the calculated speed of operation (e.g., controlled by controlling the voltage that is applied to the actuator, or by controlling the duty-cycle of pulse-width-modulation (PWM) that is applied to the actuator) in order to achieve the calculated displacement.

An iteration control method as described herein may be advantageous over other types of control methods (e.g., proportional-integral-derivative, or PID, control). For example, the control method described herein may result in less overshoot, and less sensitivity to motor backlash or other mechanical inaccuracies than other control methods. Thus, the control method described herein may enable sufficiently fast convergence of the tilt of the tiltable leveling structure to the target plane to ensure the comfort and safety of the user. Furthermore, an iterative control method as described herein is independent of dynamic parameters of the system, and thus does not require a priori knowledge of these dynamic parameters. For example, the iterative control method is independent of such dynamic parameters as mass of components, moments of inertia, and applied forces (within ranges derived from systems specifications).

Figure 1A:
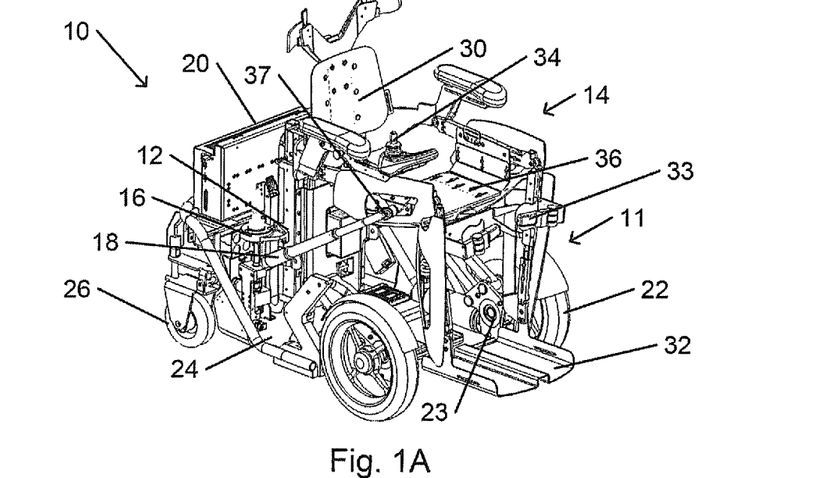
FIG. 1A schematically illustrates a wheeled mobility device configured to support a user in a sitting position, in accordance with an embodiment of the present invention.
Figure 1B:
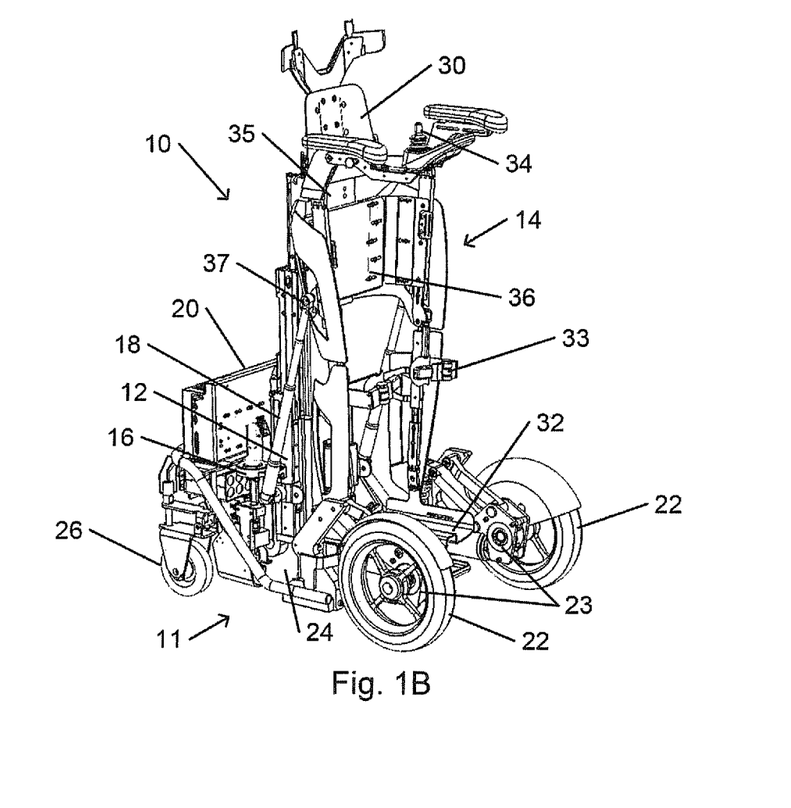
FIG. 1B schematically illustrates the wheeled mobility device of FIG. 1A, configured to support a user in a standing position.

FIG. 1A schematically illustrates a wheeled mobility device configured to support a user in a sitting position, in accordance with an embodiment of the present invention. FIG. 1B schematically illustrates the wheeled mobility device of FIG. 1A, configured to support a user in a standing position.

Wheeled mobility device 10 includes chassis 11. Chassis 11 includes a chassis floor 24 and one or more wheels (or tracks or other structure) for enabling self-propelled travel by wheeled mobility device 10 over a surface (e.g., a floor, road, sidewalk, driveway, ramp, or other surface suitable for self-propelled travel). For example, chassis 11 may include one or more drive wheels 22. Each drive wheel 22 may be connected to a wheel drive 23. For example, wheel drive 23 may include a drive motor, a transmission, or both. A drive motor may include an electric motor, an internal combustion engine, or another suitable type of motor or engine. Chassis 11 may include one or more support wheels 26. Support wheels 26 may include non-driven wheels that provide stable support for wheeled mobility device 10 (e.g., such that the total number of wheels, including drive wheels 22 and supports wheels 26, is at least three, e.g., at least four with two drive wheels 22 and two support wheels 26). For example, swivel wheels 26 may be connected to chassis 11 by bearings that enable support wheels 26 to swivel freely so as to provide support without impeding movement of wheeled mobility device 10.

In wheeled mobility device 10 as shown in FIGS. 1A and 1B, swivel wheels 26 are located at the rear of the device. Alternatively, swivel wheels 26 may be located at the front of the device while drive wheels 22 may be located at the rear. As another example, drive wheels 22 may be located near the center chassis 11 with two sets of swivel wheels 26, e.g., one set being located at the front of wheeled mobility device 10, and the other at the rear.

In some cases, steering of wheeled mobility device 10 may be achieved by separate control of speeds of rotation of two different support wheels 26. In some cases, the speed of rotation may be controlled by controlling a voltage that is applied to a motor of wheel drive 23 (e.g., via electrical unit 20). For example, rotating one of drive wheels 22 more rapidly about its axis (e.g., axle) than the other drive wheel 22 may turn wheeled mobility device 10 toward the more slowly rotating drive wheel 22. In other cases, wheel drive 23 of may be configured to rotate one or more drive wheels 22 about a vertical axis in order to steer wheeled mobility device 10.

Operation of drive wheels 22 may be controlled by a user that is riding wheeled mobility device 10, or another user, by operating user controls 34 (e.g., via electrical unit 20). For example, user controls 34 may include one or more joysticks, pushbuttons, switches, levers, keyboards, keypads, pointing devices, touch screens, head movement sensors, or other controls. Some or all of user controls 34 may be mounted on wheeled mobility device 10 (e.g., on an armrest or elsewhere) so as to be conveniently accessible by a user of wheeled mobility device 10. In some cases, some or all of user controls 34 may be located on a remote device, e.g., so as to enable operation of user controls 34 by a user who is not currently riding wheeled mobility device 10.

User support 14 may include one or more components for supporting a user in one or more of a sitting, standing, or other position. For example, a back panel 30 of user support 14 may be configured to support a user's back. Back panel 30 may serve as a backrest of a seat 36 when wheeled mobility device 10 is configured to support a user in a seated position (FIG. 1A). When wheeled mobility device 10 is configured to support a user in a standing position, back panel 30 may be harnessed to the user's back in order to hold the upper body of the user in an upright orientation (FIG. 1B). Similarly, when configured to support the user in an upright position, seat 36 may be turned vertically and may be harnessed to the user's midsection in order to support the midsection in a standing position. A foot panel 32 may be configured to support the user's feet when wheeled mobility device 10 is configured to support the user in both seated and standing positions.

Support conversion mechanism 18 may be operated (e.g., a motor of support conversion mechanism 18 operated in response to operation of user controls 34 and operation of electrical unit 20) to change a configuration of user support 14. Support conversion mechanism 18 may include one or more motors, actuators, hinges, or other components that may be operated to convert user support 14 from a seated configuration to a standing configuration, and vice versa.

During operation of support conversion mechanism 18, one or more panels of user support 14 may rotate or bend relative to another. For example, seat 36, which is substantially horizontal when user support 14 is in a seated configuration, may be rotated to a substantially vertical orientation during conversion to a standing configuration, and vice versa. A connector between panels of user support 14, such as panel connection 35 between back panel 30 and seat 36, may be configured to enable one or both of the connected panels to rotate. For example, panel connection 35 may be made of a flexible material or may be hinged (or may be absent), so as to enable seat 36 to rotate back-and-forth between a vertical and a horizontal orientation during operation of support conversion mechanism 18.

For example, support conversion mechanism 18 may include a column or similar structure that may be extended (e.g., telescoped outward) or retracted (e.g., telescoped inward), rotated, or both, to raise or lower a support connection 37. For example, with user support 14 in a seated configuration, raising support connection 37 may fold seat 36 inward from a horizontal to a vertical orientation, may raise back panel 30, and may draw leg braces 33 and foot panel 32 proximally inward. Thus, support conversion mechanism 18 may convert user support 14 to a standing position. Similarly, with user support 14 in a standing configuration, lowering support connection 37 may fold seat 36 outward from a vertical to a horizontal orientation, may lower back panel 30, and may extend leg braces 33 and foot panel 32 distally inward. Thus, support conversion mechanism 18 may convert user support 14 to a seated position.

Support conversion mechanism 18 and user support 14 may be configured to maintain a center of gravity of wheeled mobility device 10 in an approximately constant lateral and longitudinal position relative to chassis 11. For example, the position of the center of gravity may be maintained approximately above a position of a geometric center of chassis 11 or a geographic center of the wheels (e.g., drive wheels 22 and support wheels 26) of chassis 11.

User support 14 is mounted on tiltable leveling structure 12. Tiltable leveling structure 12 is configured to control an orientation of user support 14. For example, tiltable leveling structure 12 may be configured to maintain an orientation at an orientation that is defined, e.g., with respect to the vertical or horizontal. Tiltable leveling structure 12 may include one or more displaceable connections 16 that are movable by actuators (e.g., as controlled by electrical unit 20) to maintain the orientation of user support 14.

Electrical unit 20 may include one or more components that enable operation of electrical or electronic components of wheeled mobility device 10. Components of electrical unit 20 may be located in a single housing (as shown in FIGS. 1A and 1B, or may be located in two or more separate housings at various locations).

Figure 1C:
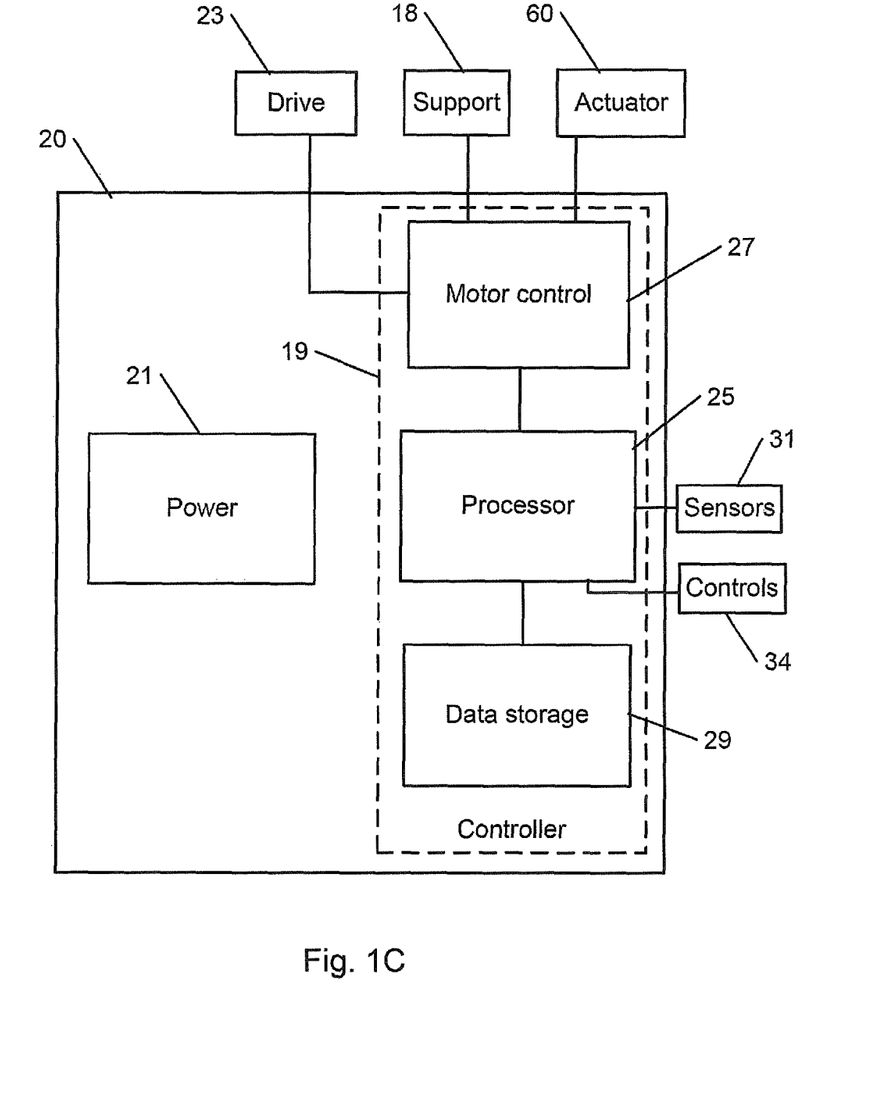
FIG. 1C is a schematic block diagram of an electrical unit of the wheeled mobility device shown in FIG. 1A.

FIG. 1C is a schematic block diagram of an electrical unit of the wheeled mobility device shown in FIGS. 1A and 1B.

Electrical unit 20 may include a controller 19 and a power source 21.

For example, power source 21 may include a storage battery, another type of battery, a solar panel, a generator, a connection to an external electrical power source (e.g., an electrical mains), or another source of electrical power.

Controller 19 may include a processor 25. Processor 25 may include one or more processing units or computers. Processor 25 may be configured to operate in accordance with programmed instructions.

Processor 25 may communicate with data storage 29. For example, data storage 29 may include one or more fixed or removable, volatile or non-volatile, remote or local, data storage units, memories, or computer-readable media. For example, data storage 29 may be utilized to store one or more of programmed instructions for operation of processor 25, parameters or data that are utilized in executing programmed instructions, or results of execution of programmed instructions.

Processor 25 may be configured to operate in accordance with one or more signals that are received from sensors 31. For example, sensors 31 may include one or more sensors that are configured to detect a tilt of a component of tiltable leveling structure 12 or of user support 14. Sensors 31 may include one or more inertial measurement units, tilt sensors, accelerometers, gyroscopes, compasses, or other sensors that may be utilised to determine an orientation (e.g., yaw, pitch, roll) of tiltable leveling structure 12, of user support 14, or of chassis 11. Sensors 31 may include sensors for measuring the tilt or slope of a surface that supports wheeled mobility device 10. Sensors 31 may include a magnetometer or compass for measuring the orientation of mobility device 10 relative to the magnetic field of the Earth. Sensors 31 may include sensors for measuring a speed of rotation of one or more wheels (e.g., drive wheels 22 or support wheels 26). Sensors 31 may include one or more navigation sensors for determining a geographic position of wheeled mobility device 10. Sensors 31 may include force sensors for measuring a current load (e.g., weight) supported by wheeled mobility device 10, a charge level of a battery of power source 21, an impact, detecting an obstacle, or other types of sensors for detecting a potentially hazardous situation or other information.

Processor 25 may be configured to operate in accordance with control input that is received from one or more user controls 34. For example, user controls 34 may be operated to indicate a desired orientation or direction of travel of wheeled mobility device 10, a desired speed of travel of wheeled mobility device 10, a desired configuration of user support 14 (e.g., seated or standing), or another indication of a command or preference by the user or another user or operator of wheeled mobility device 10.

Controller 19 may include motor control 27. Processor 25 may be configured to communicate with motor control 27 to control one or more motors. Motor control 27 may include one or more controllers that are each configured to control operation of one or more motors. For example, a motor that is controlled by motor control 27 may include a motor of a wheel drive 23, a motor of support conversion mechanism 18, or an actuator 60 of tiltable leveling structure 12. Processor 25 may be configured to apply one or more algorithms to calculate an operation of the motors on the basis of operation of user controls 34 and on the basis of one or more quantities sensed by sensors 31.

Figure 2A:
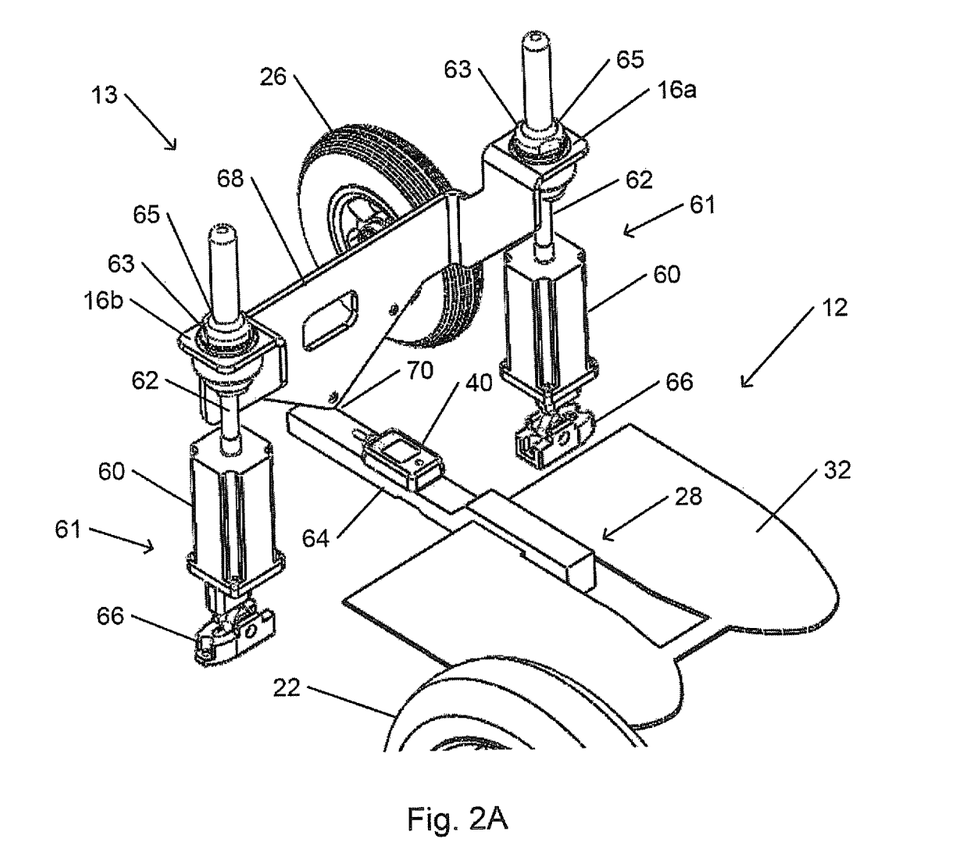
FIG. 2A schematically illustrates a tiltable leveling structure of a wheeled mobility device, in accordance with an embodiment of the present invention.
Figure 2B:
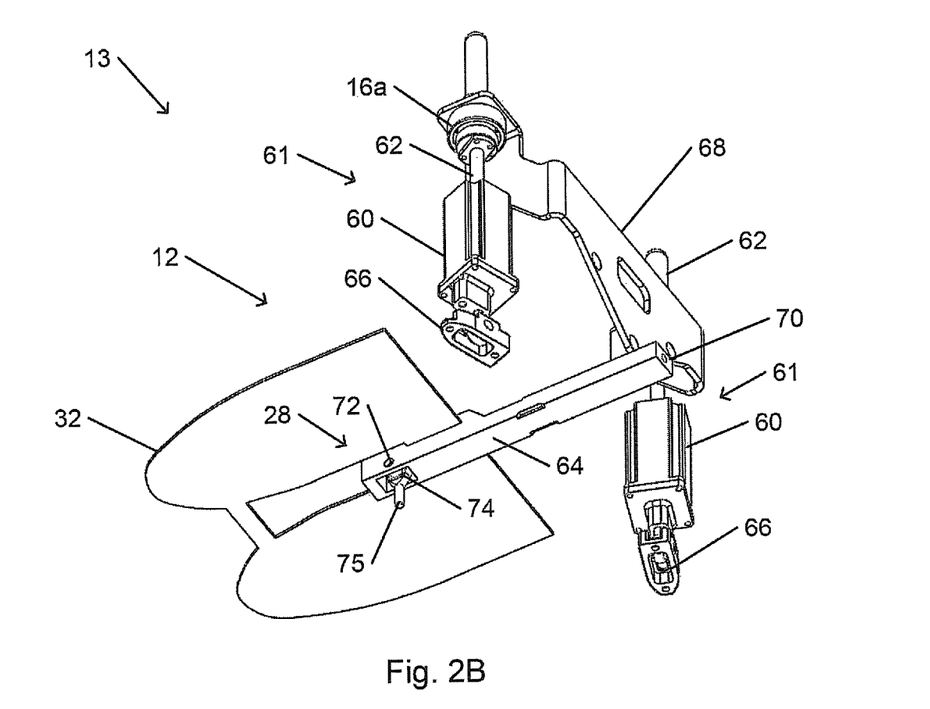
FIG. 2B is a schematic oblique view from below of the tiltable leveling structure shown in FIG. 2A.
Figure 2C:
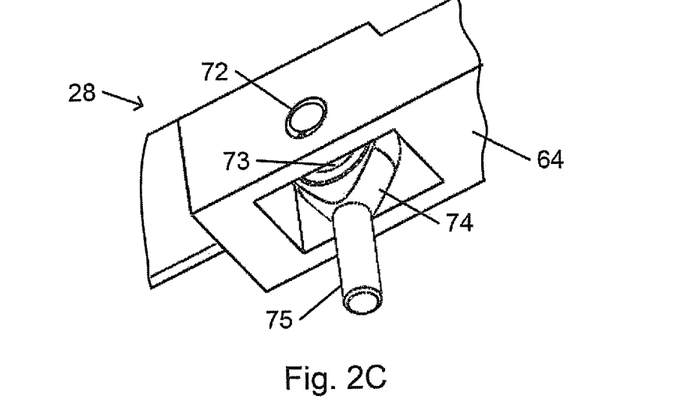
FIG. 2C is a schematic enlarged view of a swivel connection of the tiltable leveling structure shown in FIG. 2B.
Figure 2D:
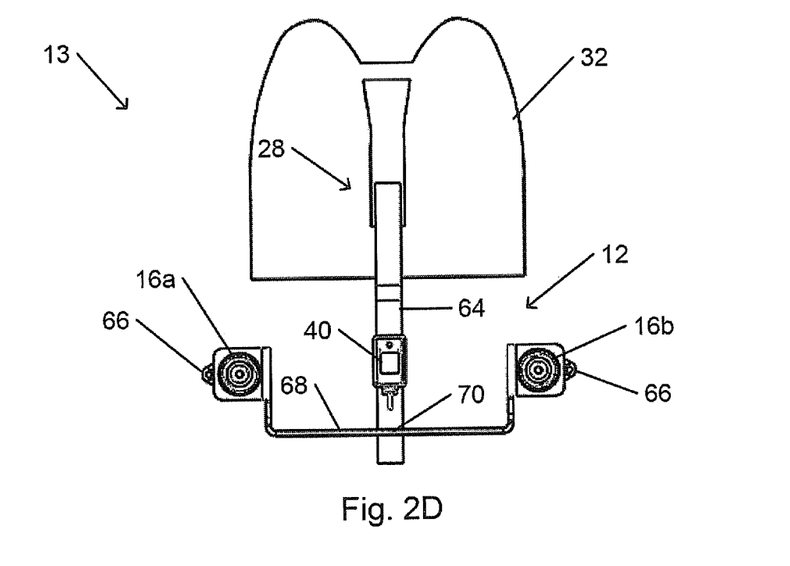
FIG. 2D is a schematic top view of the tiltable leveling structure shown in FIG. 2A.

FIG. 2A schematically illustrates a self-leveling mechanism of a wheeled mobility device, in accordance with an embodiment of the present invention. FIG. 2B is a schematic oblique view from below of the self-leveling mechanism shown in FIG. 2A. FIG. 2C is a schematic enlarged view of a swivel connection of a tiltable leveling structure of the self-leveling mechanism shown in FIG. 2B. FIG. 2D is a schematic top view of the self-leveling mechanism shown in FIG. 2A.

Self-leveling mechanism 13 includes tiltable leveling structure 12 and linear actuator assemblies 61. Linear actuator assemblies 61 are operable by controller 19 to adjust a tilt of tiltable leveling structure 12 in accordance with a tilt measured by inertial measurement unit 40, or by another sensor of sensors 31.

Shaft 75 of rod-end bearing 74 may be fixed to chassis floor 24 of chassis 11. Swivel bar 72 is located near a distal end of arm 64 of tiltable leveling structure 12. Swivel bar 72 may connect to (e.g., pass through a swivel opening 73 of) rod end bearing 74. Shaft 75 holds the opening of rod-end bearing 74, and thus swivel bar 72, at a fixed nonzero distance (e.g., with value $H_0$) above chassis floor 24. The connection to rod-end bearing 74 forms swivel connection 28. Swivel connection 28 may thus enable at least limited rotation of arm 64 and tiltable leveling structure 12 relative to shaft 75 and chassis 11. The fixed distance $H_0$ may be sufficient such that neither chassis floor 24 nor another structure of chassis 11 interferes with tilting of tiltable leveling structure 12 (within a predetermined range of tilt angles, e.g., selected to be sufficient to enable self-leveling of user support 14 when wheeled mobility device 10 travels over a surface whose maximum slope is within a predetermined range of slope angles). User support 14, including foot panel 32, is fixed to tiltable leveling structure 12. Thus, swivel connection 28 may enable sufficient tilting of user support 14 so as to maintain user support 14 in an approximately constant orientation with respect to the horizontal (typically constant roll and pitch angles with respect to the horizontal).

Linear actuator assemblies 61 are each configured to linearly displace one of displaceable connections 16a and 16b. Actuator base 66 of each linear actuator assembly 61 may be fixed to chassis floor 24. For example, each actuator 60 may be configured to rotate an actuator shaft 62 with exterior threading. Each of displaceable connections 16a and 16b may include connection structure 63 that includes an opening, sleeve, or ring with corresponding interior threading. For example, the internal threading may be located in bore of ball swivel 65 of connection structure 63. Ball swivel 65 may enable at least a limited change in orientation of actuator shaft 62 relative to tilt plate 68 or other structure of tiltable leveling structure 12. Thus, rotation of actuator shaft 62 may displace displaceable connection 16a or 16b along actuator shaft 62 to increase or decrease a distance between the displaceable connection 16a or 16b and chassis floor 24. In addition, actuator base 66 may be configured to enable actuator shaft 62 and actuator 60 rotate or tilt relative to chassis floor 24, to enable tiltable leveling structure 12 to tilt relative to chassis floor 24.

Alternatively to linear actuator assembly 61, other structures or mechanisms may be used, e.g., scissor-jack motors, eccentric drives, a hydraulic mechanism, an electromagnetic mechanism, or another mechanism. In some such alternatives, displaceable connection 16a or 16b may be fixed to actuator shaft 62. For example, actuator shaft 62 may be extendible to increase a distance between the corresponding displaceable connection 16a or 16b and chassis floor 24. Actuator shaft 62 may be retractable to decrease the distance between the corresponding displaceable connection 16a or 16b and chassis floor 24.

Each displaceable connection 16a or 16b is connected to an end of tilt plate 68. Tilt plate 68 is fixed to arm 64 at junction 70. Thus, raising or lowering displaceable connections 16a and 16b in tandem may raise or lower tilt plate 68 relative to swivel connection 28. In the arrangement shown, with arm 64 extending forward and displaceable connections 16a or 16b located at lateral (right-left) ends of tilt plate 68, the raising or lowering may change a pitch angle of arm 64, and thus of user support 14. Raising or lowering one of displaceable connections 16a and 16b relative to the other may change a lateral tilt of tilt plate 68. In the arrangement shown, the raising or lowering of one of displaceable connections 16a and 16b relative to the other may change a roll angle of arm 64, and thus of user support 14. Alternative orientations of arm 64 and of displaceable connections 16a and 16b relative to a direction of forward motion of wheeled mobility device 10 (e.g., arm 64 extending backward or to one side, with moveable points 16a and 16b being correspondingly located) may be provided.

Tillable leveling structure 12 is provided with inertial measurement unit 40, or another sensor of sensors 31, for measuring a tilt of tiltable leveling structure 12. For example, inertial measurement unit 40 may be mounted on arm 64 (as shown), on tilt plate 68, on foot panel 32, or elsewhere on tiltable leveling structure 12 or user support 14.

Processor 25 may be configured to control operation of actuators 60 in accordance with tilt angles that are sensed by inertial measurement unit 40 or by another type of sensor 31, or that are calculated from quantities that are measured by inertial measurement unit 40 or another sensor 31.

Figure 3A:
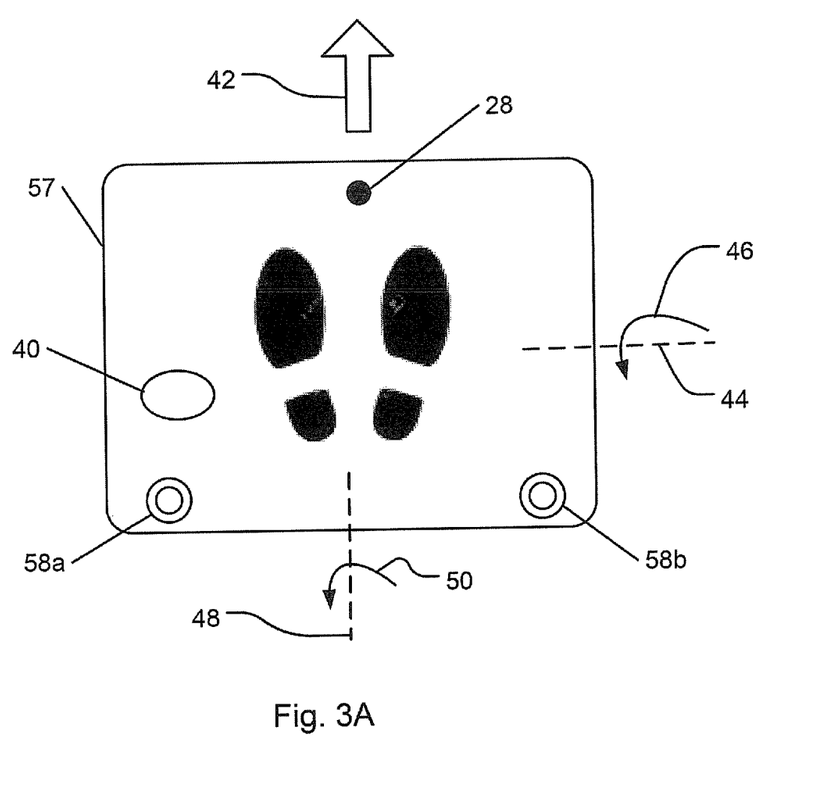
FIG. 3A schematically illustrates operation of a tiltable leveling structure of a wheeled mobility device, in accordance with an embodiment of the present invention.
Figure 3B:
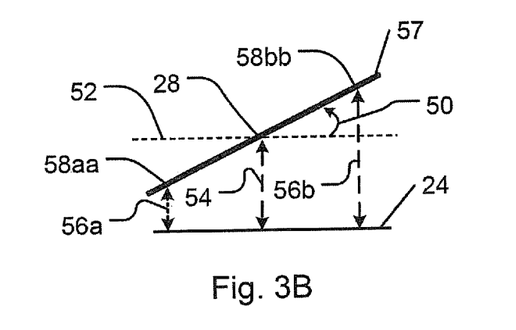
FIG. 3B schematically illustrates a cross-sectional view along a lateral axis of the tiltable leveling structure shown in FIG. 3A illustrating roll angle control.
Figure 3C:
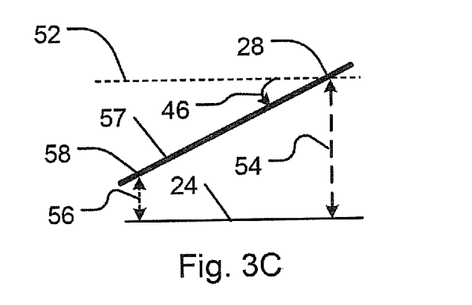
FIG. 3C schematically illustrates a cross sectional view along a longitudinal axis of the tiltable leveling structure shown in FIG. 3A illustrating pitch angle control.

FIG. 3A schematically illustrates operation of a tiltable leveling structure of a wheeled mobility device, in accordance with an embodiment of the present invention. FIG. 3B schematically illustrates a cross sectional view along a lateral axis of the tiltable leveling structure shown in FIG. 3A, illustrating roll angle control. FIG. 3C schematically illustrates a cross sectional view along a longitudinal axis of the tiltable stabilizing structure shown in FIG. 3A, illustrating pitch angle control.

For the sake of simplicity, tiltable stabilizing structure 12 is represented in FIGS. 3A-3C by a representative plane 57. When tiltable stabilizing structure 12 is in a quiescent state, e.g., when wheeled mobility device 10 is standing on a level horizontal surface or tiltable stabilizing structure 12 or user support 14 otherwise have a target orientation, the representative plane 57 is parallel to a target plane 52. For example, target plane 52 may be horizontal, or have another orientation, that is preferred by a user of wheeled mobility device 10. (For example, a particular user may feel comfortable leaning slightly backward or forward, to the right or left, or at another target orientation.)

Representative plane 57 may be understood to represent a plane that is defined by swivel connection 28 and by displaceable connections 16a and 16b. In this case, projected displaceable connections 58a and 58b are identical with displaceable connections 16a and 16b, respectively, with the tilt of target plane 52 adjusted accordingly (e.g., target plane 52 may not be horizontal when a component of wheeled mobility device 10, such as seat 36, is to be maintained horizontal).

Alternatively, representative plane 57 may be defined such that the tilt of target plane 52 is identical to the tilt at which a component of wheeled mobility device 10, such as seat 36) is to be maintained (e.g., as defined with respect to the local horizontal and vertical). In this case, representative plane 57 of tiltable leveling structure 12 may be determined by initially defining a plane that is parallel to particular longitudinal axis 48 (e.g., an axis that is parallel to a projection of direction of forward motion 42 into target plane 52) and that includes displaceable connections 16a and 16b. Representative plane 57 then is a plane parallel to this defined plane that includes swivel connection 28. Projected displaceable connections 58a and 58b represent projections of displaceable connections 16a and 16b, respectively, into representative plane 57 along a line of translation of each displaceable connection 16a or 16b. For example, the line of translation of displaceable connection 16a or 16b may be the axis of its corresponding actuator shaft 62. Thus, a displacement of projected displaceable connection 58a or 58b is equal to a displacement of the corresponding displaceable connection 16a or 16b.

In the configuration shown, swivel connection 28 is located at or near a lateral midpoint of a front end of representative plane 57, the front end being determined by direction of forward motion 42. Projected displaceable connections 58a and 58b are located near left and right corners, respectively, of a rear end of representative plane 57. Other placements of swivel connection 28 and of projected displaceable connections 58a and 58b (corresponding to other configurations of tiltable stabilizing structure 12) may be provided.

A tilt of tiltable stabilizing structure 12 may be characterized with reference to a target plane 52.

Representative plane 57 is characterized by longitudinal axis 48 (substantially parallel to direction of forward motion 42), and by lateral axis 44 (substantially perpendicular to longitudinal axis 48). A tilt resulting from a rotation of tiltable stabilizing structure 12 about lateral axis 44 with respect to target plane 52 may be quantified as pitch angle 46 (with value $\theta_P$). Similarly, a tilt resulting from a rotation of tiltable stabilizing structure 12 about longitudinal axis 48 with respect to target plane 52 may be quantified as roll angle 50 (with value $\theta_R$). Values $\theta_P$ of pitch angle 46 and $\theta_R$ of roll angle 50 may be measured by inertial measurement unit 40, or by a similar sensor.

Swivel connection 28 is located a constant distance 54 (with constant value $H_0$) from chassis floor 24. Distance 54 is sufficient such that when chassis 11 or wheeled mobility device 10 standing or travelling over a surface that is sloped within a predetermined range of slopes, projected displaceable connections 58a and 58b (and displaceable connections 16a and 16b) may be moved toward chassis floor 24 so as to maintain representative plane 57 in an orientation that is parallel to target plane 52. For example, a maximum slope that is to be accommodated by motion of displaceable connections 16a and 16b may be a maximum slope upon which wheeled mobility device 10 may safely travel.

Each of projected displaceable connections 58a and 58b is at a variable distance 56a or 56b, respectively (with changeable values $H_1$ and $H_2$, respectively, e.g., within the range zero to $2H_0$), from chassis floor 24. Variable distance 56a, 56b, or both, may be changed by operating one or more actuators 60. In FIG. 3C, projected displaceable connection 58 represents a point where a line through projected displaceable connections 58a and 58b intersects the plane of the section shown in FIG. 3C. Projected displaceable connection 58 is at a distance 56 from chassis floor 24.

An iterative control algorithm may be applied by processor 25 to control operation of actuators 60 via motor control 27.

Figure 4:
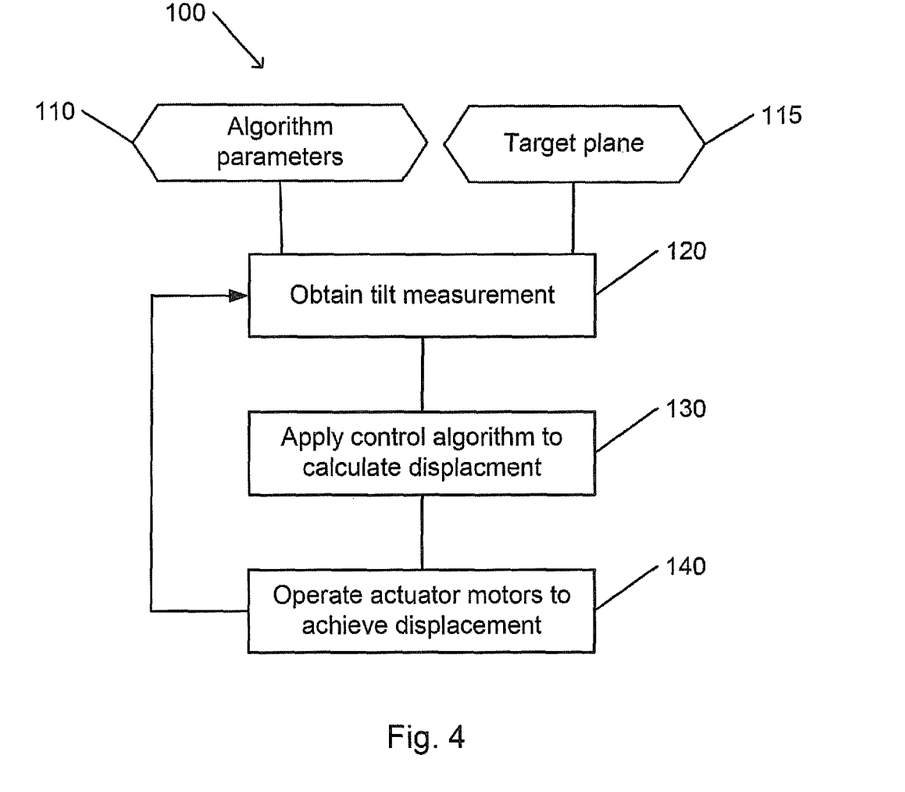
FIG. 4 is a flowchart depicting a method for controlling a tiltable leveling structure of a wheeled mobility device, in accordance with an embodiment of the present invention.
Figure 5:
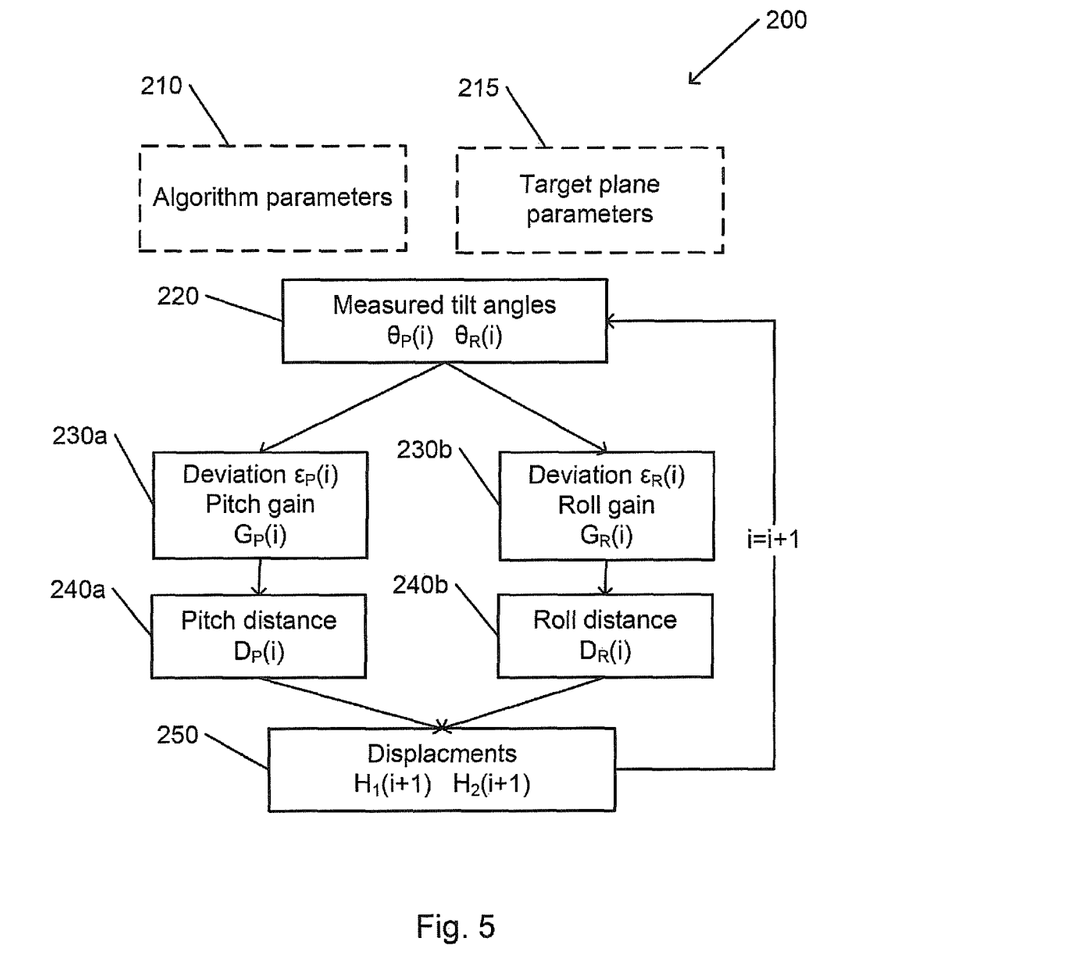
FIG. 5 is a block diagram of a control algorithm of the method depicted in FIG. 4.

FIG. 4 is a flowchart depicting a method for controlling a tiltable leveling structure of a wheeled mobility device, in accordance with an embodiment of the present invention. FIG. 5 is a block diagram of a control algorithm of the method depicted in FIG. 4.

It should be understood, with respect to any flowchart or block diagram referenced herein, that the division of the illustrated method into discrete operations represented by blocks of the flowchart or block diagram has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Tilt control method 100 may be executed by processor 25 of wheeled mobility device 10. For example, tilt control method 100 may be executed continually while power source 21 is switched on, while wheel drive 23 is operating, upon operation of a user control 34 to move or change a configuration of wheeled mobility device 10, or in response to another predetermined event or condition.

One or more algorithm parameters 210 used in application of a control algorithm 200 may be predetermined or predefined (block 110). Such algorithm parameters 210 may include one or more gain factors, one or more factors related to operation of actuators 60, or other parameters used in application of control algorithm 200. For example, the parameters may include gain adjustment factors $K_P$ and $K_R$, exponents p and r, length conversion factor $\Delta$, or other parameters that are utilized during application of control algorithm 200 as described below. Algorithm parameters 210 may be defined, for example, during development of a model of a wheeled mobility device 10, during production, adjustment, maintenance or calibration of a particular wheeled mobility device 10, or otherwise. Algorithm parameters 210 may be adjusted in accordance with preferences of a user of a particular wheeled mobility device 10. For example, algorithm parameters 210 may affect smoothness or jerkiness of motions, preferred speed of motion, another user preference, or another characteristic of operation of wheeled mobility device 10.

One or more target plane parameters 215 may be predetermined or predefined for characterizing target plane 52 (block 115). Target plane parameters 215 may include roll and pitch angles, or other parameters that define target plane 52. For example, target plane parameters 215 may be defined during calibration, adjustment, or maintenance of a particular wheeled mobility device 10, during adaption of a particular wheeled mobility device 10 to a particular user, or at another time.

Target plane parameters 215 may include, for example, a target pitch angle $\Theta_P$ and a target roll angle $\Theta_R$. For example, $\Theta_P=0$ and $\Theta_R=0$ may indicate that tiltable leveling structure 12 and representative plane 57 are to be maintained horizontal. Values of $\Theta_P>0$ may indicate a preference for a backward tilt, while $\Theta_P<0$ may indicate a preference for a forward tilt. Tilt control method 100 is configured to adjust a tilt of tiltable stabilizing structure 12 with the goal of maintaining representative plane 57 parallel to target plane 52.

Execution of tilt control method 100 includes a series of iterations. During each iteration, operation of actuators 60 is controlled in accordance with measurements and calculations that are made during that iteration. In the following, each iteration is numbered with an index i.

Measured values of tilt angles of tiltable leveling structure 12 at the current iteration i may be obtained (blocks 120 and 220). For example, the measured tilt angles may include pitch angle $\theta_P(i)$ and roll angle $\theta_R(i)$, or another set of angles that defines a tilt of tiltable stabilizing structure 12. The tilt angle measurements may be received from inertial measurement unit 40, or from another sensor. Alternatively or in addition, the tilt angle measurements may be obtained by analysis of received signals that indicate one or more measured quantities that are related to the tilt angles.

A displacement of each of displaceable connections 16a and 16b to be applied during the current iteration may be calculated based on a deviation of the measured (block 130). In some cases, the calculation may be considered to include the following steps:

A deviation $\varepsilon_P = \theta_P(i) - \Theta_P$ of measured pitch angle $\theta_P(i)$ from target pitch angle $\Theta_P$ may be calculated. A pitch gain factor $G_P(i)$ may be calculated as $$G_P(i) = \text{sign}(\varepsilon_P(i)) \cdot K_P \cdot |\varepsilon_P(i)|^p,$$

where $K_P$ is a multiplicative factor and p is an exponent (block 230a).

The gain may be converted to pitch deviation distance $D_P(i)$ by multiplying pitch gain factor $G_P(i)$ by length conversion factor $\Delta$:

$$D_P(i) = G_P(i) \cdot \Delta \text{(block 240a)}.$$

Similarly, a deviation $\varepsilon_R = \theta_R(i) - \Theta_R$ of measured roll angle $\theta_R(i)$ from target roll angle $\Theta_R$ may be calculated. A roll gain factor $G_R(i)$ may be calculated as $$G_R(i) = \text{sign}(\varepsilon_R(i)) \cdot K_R \cdot |\varepsilon_R(i)|^r,$$

where $K_R$ is a multiplicative factor and r is an exponent (block 230b).

The gain may be converted to roll deviation distance $D_R(i)$ by multiplying, roll gain factor $G_R(i)$ by length conversion factor $\Delta$:

$$D_R(i) = G_R(i) \cdot \Delta \text{(block 240b)}.$$

A displacement of each of displaceable connections 16a and 16b in order to correct the deviations $\varepsilon_P$ and $\varepsilon_R(i)$ may be calculated on the basis of the deviation distances $D_P(i)$ and $D_R(i)$ (block 250). The calculated displacements are configured to reduce the values of $\varepsilon_P(i)$ and $\varepsilon_R(i)$ at the start of the next iteration (e.g., in the absence of any further change in the tilt of chassis 11 such as would be caused, e.g., by a change in slope of terrain or another surface that supports wheeled mobility device 10) to a value that is close to zero.

The displacements may be calculated as linear combinations of the deviation distances $D_P(i)$ and $D_R(i)$. For example, displaceable connection 16a (and, equivalently, projected displaceable connection 58a), at current distance $H_1(i)$ from chassis floor 24, may be displaced such that:

$$H_1(i+1) = H_1(i) - D_P(i) D_R(i).$$

Similarly, displaceable connection 16b (and, equivalently, projected displaceable connection 58b), at current distance $H_2(i)$ from chassis floor 24, may be displaced such that:

$$H_2(i+1) = H_2(i) - D_P(i) - D_R(i).$$

The displacements of $H_1$ and $H_2$ may be expressed in units of length (e.g., millimeters or centimeters), a rotation angle or number of rotations of actuator 60 (e.g., turning a screw of a screw mechanism, as shown, a screw of a scissor jack mechanism, an eccentric disk, or another mechanism for converting rotation of a motor to linear motion), or otherwise.

The actuator 60 associated with each of displaceable connections 16a and 16b be operated to achieve the calculated displaced distances from chassis floor 24, $H_1(i+1)$ and $H_2(i+1)$, respectively, during the current iteration (block 140).

For example, a speed and direction of operation of each actuator 60 may be controlled (e.g., via operation of motor control 27) to achieve the calculated displaced distance by the start of the following iteration (returning to blocks 120 and 220). In some cases, the speed of operation of each actuator 60 may be limited such that a rate of tilting of tiltable leveling structure 12 is in the range 1 degree per second to 10 degrees per second, e.g., about 4 degrees per second.

When one or both of exponents p and r are greater than zero (e.g., p=r=2, or p or r being equal to another positive number), such that the absolute value of $\varepsilon_P$ and $\varepsilon_R$ is raised to a positive power, the calculated deviation distances $D_P$ and $D_R$ are proportionally greater for greater measured deviations $\varepsilon_P$ and $\varepsilon_R$ than for smaller deviations. In this case, the changes in distances $H_1$ and $H_2$ during a single iteration are larger for large deviations than for small deviations. Thus, in the case of a large deviation, the orientation of tiltable leveling structure 12 is rapidly returned to that of target plane 52. Such rapid return to the target orientation may enable wheeled mobility device 10 to travel safely over surfaces of varying slope. One the other hand, when the deviations are small, the tilt of tiltable stabilizing structure 12 is varied slowly, enabling a smooth ride for the user of wheeled mobility device 10. In this case, the control loop may be described as having an adaptive bandwidth: wider for larger errors and narrower for smaller errors.

On the other hand, when the values of the exponents are zero, p=r=0, the calculated deviation distances $D_P$ and $D_R$, and thus the changes in distances $H_1$ and $H_2$, are independent of deviations $\varepsilon_P$ and $\varepsilon_R$.

Values of exponents p and r, as well as those of factors $K_P$, $K_R$, and $\Delta$, may be selected in accordance with one or more of properties or characteristics of a particular or representative wheeled mobility device 10, of a preference of a particular or representative user of wheeled mobility device 10, or otherwise.

A user self-leveling apparatus for wheeled mobility device 10 and a tilt control method 100, in accordance with an embodiment of the present invention, may be advantageous over other types of self-leveling systems. In particular, the mechanism for tilting tiltable stabilizing structure 12, using linear actuators and a fixed swivel connection 28, may be advantageous over double-gimbal mechanism with angular actuators for producing two mutually orthogonal rotations.

For example, the mechanism for tilting tiltable leveling structure 12 may occupy less space, require less maintenance, and may be less expensive than a typical double-gimbal mechanism. Actuators 60 produce linear translation only and are not orthogonal to each other (such that movement of each of displaceable connections 16a and 16b affects both roll and pitch), For example, control algorithm 200 may be robust, simpler, and more easily configured than an algorithm for controlling a double-gimbal mechanism. The control algorithm 200 is configured to always converge to the orientation of representative plane 57 that of target plane 52, even in the presence of small mechanical inaccuracies such as backlash.

Control algorithm 200 may be advantageous over other algorithms (such as PID) due to its simplicity, smooth operation, and robustness. Application of an adaptive control-loop, as in application of control algorithm 200, may prevent overshooting, undershooting, and limit-cycle phenomena.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A mobility device for supporting a user in an orientation, while the user is in a sitting position, a standing position, or an in-between position, the device comprising:
    a chassis configured to propel the mobility device on a surface;
    a self-leveling mechanism comprising a leveling structure coupled with a user support, wherein the structure is connected to the chassis by a swivel connection that enables pitch and roll motion of the structure and by two linearly displaceable connections that are laterally displaced from one another;
    a sensor configured to measure a pitch angle and a roll angle of the structure with respect to the chassis, wherein the pitch angle corresponds to angular motion forward and backward of the structure and the roll angle corresponds to angular motion sideways (lateral) of the structure, and wherein the sensor is an inertial measurement unit;
    a controller utilizing an adaptive closed-loop based algorithm, the controller being configured to operate at least one linear actuator for maintaining the orientation of the structure, and
    a conversion mechanism operable to convert the user support from a sitting configuration to a standing configuration, and vice versa;
    wherein the self-leveling mechanism consists of two linear actuators, wherein each of the linear actuators is configured to displace a displaceable connection of said two linearly displaceable connections to adjust a distance between the user support and the chassis.

2. The device of claim 1, wherein the swivel connection comprises a rod end bearing.

3. The device of claim 1, wherein the swivel connection is located at a fixed distance from a floor of the chassis.

4. The device of claim 1, wherein the swivel connection is located along an arm of the leveling structure.

5. The device of claim 4, wherein the swivel connection is located at one end of the leveling structure and the two displaceable connections are located at an opposite end of the leveling structure.

6. The device of claim 1, wherein each of the displaceable connections is configured to be displaced by its linear actuator substantially vertically.

7. The device of claim 1, further comprising at least one motor, at least one actuator, at least one column, and any combination thereof configured to change the user support between sitting and standing positions while maintaining a center of gravity of the user support substantially constant when the user support changes between the sitting and standing positions.

8. A method of adjusting the orientation of the user support of the mobility device of claim 7, the method comprising:
    receiving measurements of pitch and roll angles from the sensor;
    calculating pitch and roll displacements required to orient the user's support to a defined orientation; and
    displacing at least one displaceable connection with at least one linear actuator by the displacement that is calculated.

9. The method of claim 8, wherein the calculating is based on an algorithm combining co-dependent pitch and roll deviations, wherein a pitch deviation is a difference between measured pitch angle and a pitch angle of the defined orientation, and wherein a roll deviation is a difference between measured roll angle and a roll angle of the defined orientation.

* * * * *